United States Patent
Aigner et al.

(10) Patent No.: US 10,711,706 B2
(45) Date of Patent: Jul. 14, 2020

(54) EXHAUST GAS FLAP DRIVE

(71) Applicant: TENNECO GMBH, Edenkoben (DE)

(72) Inventors: Johannes Aigner, Karlsruhe (DE);
Bernd Fuhrmann, Harthausen (DE)

(73) Assignee: TENNECO GMBH, Edenkoben (DE)

( * ) Notice: Subject to any disclaimer, the term of this patent is extended or adjusted under 35 U.S.C. 154(b) by 26 days.

(21) Appl. No.: 15/532,155

(22) PCT Filed: Nov. 23, 2015

(86) PCT No.: PCT/EP2015/077335
§ 371 (c)(1),
(2) Date: Jun. 1, 2017

(87) PCT Pub. No.: WO2016/091565
PCT Pub. Date: Jun. 16, 2016

(65) Prior Publication Data
US 2017/0268433 A1    Sep. 21, 2017

(30) Foreign Application Priority Data

Dec. 12, 2014 (DE) ........................ 10 2014 118 492

(51) Int. Cl.
*F16K 1/22* (2006.01)
*F16K 31/04* (2006.01)
(Continued)

(52) U.S. Cl.
CPC ........... *F02D 9/1065* (2013.01); *F01N 13/08* (2013.01); *F02D 9/08* (2013.01); *F16D 3/72* (2013.01);
(Continued)

(58) Field of Classification Search
CPC . F16D 3/72; F02D 9/08; F02D 9/1065; F16K 1/221; F16K 31/043; F16K 31/045; F16K 31/048; F01N 13/08
See application file for complete search history.

(56) References Cited

U.S. PATENT DOCUMENTS 1,950,448 A    3/1934 Heisterkamp
2,514,394 A    1/1945 Irving
(Continued)

FOREIGN PATENT DOCUMENTS

DE    41 31 502 A1    4/1992
DE    10 2009 016 597 A1    10/2010
(Continued)

*Primary Examiner* — Audrey K Bradley
(74) *Attorney, Agent, or Firm* — Hudak, Shunk & Farine Co. LPA

(57) ABSTRACT

An exhaust gas flap drive for an internal combustion engine, including a driveshaft which has a central axis m, an exhaust gas flap shaft, which is indirectly connected to the driveshaft and has a central axis k, and a coupling element, which is designed as a spring. The coupling element has a first end portion which is rotationally fixed to the driveshaft, and the driveshaft has a receiving area in which the end portion is mounted. The coupling element additionally has a second end portion which is rotationally fixed to the exhaust gas flap shaft via a coupling element, and the receiving area is designed as a groove which is provided on the end face of the driveshaft. The groove has a groove base and two groove flanks which delimit a width b of the groove. The width b decreases towards the groove base, and/or the coupling element has a form-fitting connection with the second end portion in a direction of the central axis k.

18 Claims, 2 Drawing Sheets

(51) Int. Cl.
*F02D 9/08* (2006.01)
*F02D 9/10* (2006.01)
*F16D 3/72* (2006.01)
*F01N 13/08* (2010.01)

(52) U.S. Cl.
CPC ............ *F16K 1/221* (2013.01); *F16K 31/043* (2013.01); *F16K 31/045* (2013.01); *F16K 31/048* (2013.01)

(56) References Cited

U.S. PATENT DOCUMENTS

| 7,374,147 B2 | 5/2008 | Nohl et al. | |
| 2008/0035869 A1* | 2/2008 | Simpson | F16K 1/221 251/129.12 |

FOREIGN PATENT DOCUMENTS

| EP | 1 887 200 A1 | 2/2008 |
| EP | 2 180 167 A1 | 4/2010 |

* cited by examiner

EXHAUST GAS FLAP DRIVE

FIELD OF THE INVENTION

The invention relates to an exhaust gas flap drive for an internal combustion machine with a drive shaft featuring a middle axis m with an exhaust gas flap shaft indirectly connected to the drive shaft and featuring a middle axis k, and with a coupling element designed as a spring which connects the drive shaft to the exhaust gas flap shaft, wherein the coupling element has a first end section E1 which is connected to the drive shaft in a torque-proof manner, wherein the drive shaft has a holder in which the end section E1 is supported, wherein the coupling element also has a second end section E2 which is connected via a coupling member to the exhaust gas flap shaft in a torque-proof manner.

BACKGROUND OF THE INVENTION

An exhaust gas flap drive is already known from DE 10 2009 016 597 B4. This has a coupling spring, via which the motor shaft is coupled to the exhaust gas flap shaft. A clip holder is provided on the motor shaft which serves to retain or affix the coupling spring on the end side.

An exhaust gas flap drive is known from U.S. Pat. No. 7,374,147 B2 in which the flap shaft is connected via a first coupling spring with a coupling disc, wherein the coupling disc is coupled via a second coupling spring to the housing. In both cases, the coupling disc is in a form fit with the respective coupling spring in the circumferential direction via a groove or a pin. The second coupling spring also has in the axial direction an at least single-sided form fit with the hook-shaped pin of the coupling disc.

DE 41 31 502 A1 describes a valve flap with a valve axis, which is directly driven by a pulley. A return spring is arranged at each end of the valve axis. The lower return spring is suspended in a groove of the bush and has a non-backlash-free form fit in the axial direction and in a circumferential direction.

Additionally, an exhaust gas flap drive is known from EP 1 887 200 A1. This has a flat coupling spring, via which the motor shaft is coupled to the exhaust gas flap shaft. A slit holder is provided on the exhaust gas flap shaft, which serves to retain in a torque-free manner or affix the coupling spring.

SUMMARY OF THE INVENTION

The object of the invention is to design and arrange an exhaust gas flap drive in such a manner that simple mounting and lower production costs are guaranteed.

The object is achieved according to the invention by the fact that the coupling member and the second end section E2 ha a form fit in the axial direction to the middle axis k and in the circumferential direction, and are therefore indirectly or directly connected in a form fit manner. This form fit is preferably backlash-free in the circumferential direction. This can in particular be guaranteed by a clip connection based on spring characteristics, or alternatively by a welded joint. As a result, it is achieved that the coupling element is affixed to the coupling member via the form fit, and this construction unit can be affixed to the exhaust gas flap shaft in a simple manner. Since the form fit also extends in the circumferential direction, a connection with no degree of freedom is achieved between the end section E2 and the coupling member. The coupling element is thus firmly connected to the coupling member, so that the coupling member and coupling element form a construction unit. During mounting, this construction unit can be set onto the exhaust gas flap shaft and welded, for example. The travel motion of the coupling element or the spring can be transferred backlash-free to the valve or exhaust gas flap shaft. The coupling member therefore serves as a gear member, both for closing and opening the exhaust gas flap shaft and the exhaust gas flap affixed to it.

By using a clip connection, the lack of backlash is also provided in the axial direction. The lack of backlash is however already achieved by the axial pre-tensioning of the coupling member between the exhaust gas flap shaft and the drive shaft.

Further, it can be advantageous when the coupling member is designed at least partially as a disc with an edge running around the middle axis m, wherein at least two or three recesses or slits, which run radially, are provided on the edge, and which serve as a holder for the end section E2. The slits arranged in the disc on the edge of the disc guarantee a laying down of the coupling element around the edge, i.e. from the front to the rear side of the disc. Thus, a form fit is guaranteed between the coupling element and the disc, which is effective in the axial direction in particular. Through the use of the slit, a form fit between the coupling element and the disc which is effective in the circumferential direction is also guaranteed. The latter offers the advantage to the assembly that the coupling element relating to the end section E1 of the motor shaft can be aligned according to the motor shaft, or according to the groove of the motor shaft, by actuating the exhaust gas flap.

It can also be advantageous when three recesses, which are distributed over the edge, are provided on the coupling member, wherein two recesses are arranged diametrically to each other. Due to the diametrically arranged recesses, a central arrangement of the coupling element, i.e. an arrangement or support in the area of the middle axis m is guaranteed. Since the coupling element is preferably clipped into the recesses on the coupling member, the splaying effect of the coupling element is facilitated for clipping-on purposes. The disc is inserted into the U-shaped end section E2 in the circumferential direction up to its maximum diameter, and can thus be pre-tensioned outwards in the radial direction in order to be clipped in via the disc or the disc edge, so that clipping in is possible into the recess when the appropriate recess is reached.

The use of the third recess guarantees a secure hold of the coupling element on the disc on the one hand, and the guiding back of the coupling element or end section E2 on the other, starting from the rear side of the disc onto the front side of the disc. The latter is achieved while maintaining the maximum width of the construction unit, which corresponds to the diameter of the disc, so that the coupling element does not protrude over the diameter in the edge area in particular. The third recess also guarantees the folding back of the edge over a partial area, and thus the formation of a shoulder for use as a stop means for the disc.

Here, it can advantageously be provided that the disc has a front side and a rear side, wherein the end section E2 is arranged on the front side and on the rear side. With the arrangement of the coupling element on the front and rear side, a latching with the disc, and therefore a form fit, is guaranteed in the axial direction.

For the present invention, it can be of particular importance when the disc has a radius rs, and over a partial circumference U, a shoulder which extends in the radial and/or axial direction, with a radius ru, with ru>rs. The shoulder which protrudes in the radial direction serves as an end stop for the exhaust gas flap within the exhaust gas pipe, at least in the "open" position, and additionally, if necessary, in the "closed" position. The "closed" position is usually achieved when the exhaust gas flap and the exhaust gas pipe push against each other. The shoulder is here merely formed via a partial area of 40° to 50°. The remaining portion of the coupling member is disc-shaped and has the slits described above for holding the coupling element.

In connection with the design and arrangement according to the invention, it can be advantageous when the end section E2 has a thickness e, wherein the coupling member and/or the end section E2 protrudes to a maximum degree a in the radial direction to the middle axis k via the disc, with 0<=2m<=e.

Due to the limitation of the degree a, and therefore of the protrusion of the coupling element in the radial direction beyond the disc, the assembly, consisting of the coupling element and disc, can itself be limited overall to the diameter of the disc itself. This guarantees the retention in a cylinder with an inner diameter, which is slightly larger than the outer diameter of the disc itself.

To this end, it can also be advantageous when the holder is designed as a recess in the form of an axially aligned groove or in the form of a radially aligned bore hold, which is provided on the end or front side on the drive shaft, wherein the groove has a groove base and two groove flanks, which limit a width b of the groove, wherein the width b decreases towards the groove base and has a trapezoid profile Q, for example. Thus, the axial pre-tensioning of the spring alone creates a force fit with the groove or groove flanks, so that the coupling element is held within the groove or on the drive shaft. According to the invention, a trapezoid profile with a pitching angle between 2° and 5° guarantees a very good clamp seat or force fit without the coupling element having to be used with an increased force effect.

It can further be advantageous to provide an exhaust gas flap drive with a motor which is connected to the drive shaft, and with an exhaust gas flap which is affixed to the exhaust gas flap shaft, and with an exhaust gas flap channel in which the exhaust gas flap is arranged. The above exhaust gas flap drive can overall be a part of an assembly of an exhaust gas flap valve consisting of a motor, exhaust gas flap drive, exhaust gas flap and exhaust gas flap channel.

Additionally, an exhaust gas flap drive with at least a portion of an exhaust gas facility for a motor vehicle can be advantageous.

The invention also relates to a construction unit for an exhaust gas flap drive as described above, consisting of a coupling element designed as a spring, wherein the coupling element has a first end section E1 which can be connected to the drive shaft of the exhaust gas flap drive, wherein the coupling element additionally has a second end section E2 which is indirectly connectible to the exhaust gas flap shaft.

The object is also achieved by means of the fact that a coupling member is provided which, in relation to an axial direction to the middle axis k and in the circumferential direction to the middle axis k, is connected to the coupling element in a form and/or force fit manner.

The invention relates to a method for mounting an exhaust gas flap drive for an internal combustion machine with a drive shaft featuring a middle axis m with an exhaust gas flap shaft to be indirectly connected to the drive shaft and featuring a middle axis k, and with a coupling element designed as a spring, wherein the coupling element has a first end section E1 which is connected to the drive shaft in a torque-proof manner, wherein the drive shaft has a holder in which the end section E1 is supported, wherein the coupling element also has a second end section E2 which is connected via a coupling member to the exhaust gas flap shaft in a torque-proof manner.

The object is further achieved by means of the fact that the coupling member is connected or welded to the exhaust gas flap shaft, and subsequently, via the recesses or slits, the coupling element is connected to the coupling member in the axial direction to the middle axis m and in a form fit manner and with no degree of freedom in the circumferential direction, and subsequently, the coupling element is connected to the drive shaft or the coupling element is connected to the coupling member in the axial direction to the middle axis m and in a form fit manner and with no degree of freedom in the circumferential direction, and only then is the connection made between the coupling member and the exhaust gas flap shaft, or the connection between the coupling element and the drive shaft. The assembly of the construction unit consisting of the coupling element and coupling member guarantees simple, fast mounting with the flap shaft and motor shaft. The construction unit can be pitched relative to the motor shaft via the flap shaft, and aligned according to the groove of the motor shaft, without a displacement or loosening of the construction unit on the flap shaft being possible.

For this purpose, it is advantageous when several recesses are provided on the coupling member, and the end section E2 is clipped into the recesses in a form fit manner. With such a clip connection, which is possible while using the spring characteristics of the coupling element, simple mounting is possible.

BRIEF DESCRIPTION OF THE DRAWINGS

Further advantages and details of the invention are explained in the patent claims and in the description, and demonstrated in the figures, in which:

DETAILED DESCRIPTION OF THE INVENTION

Figure 1:
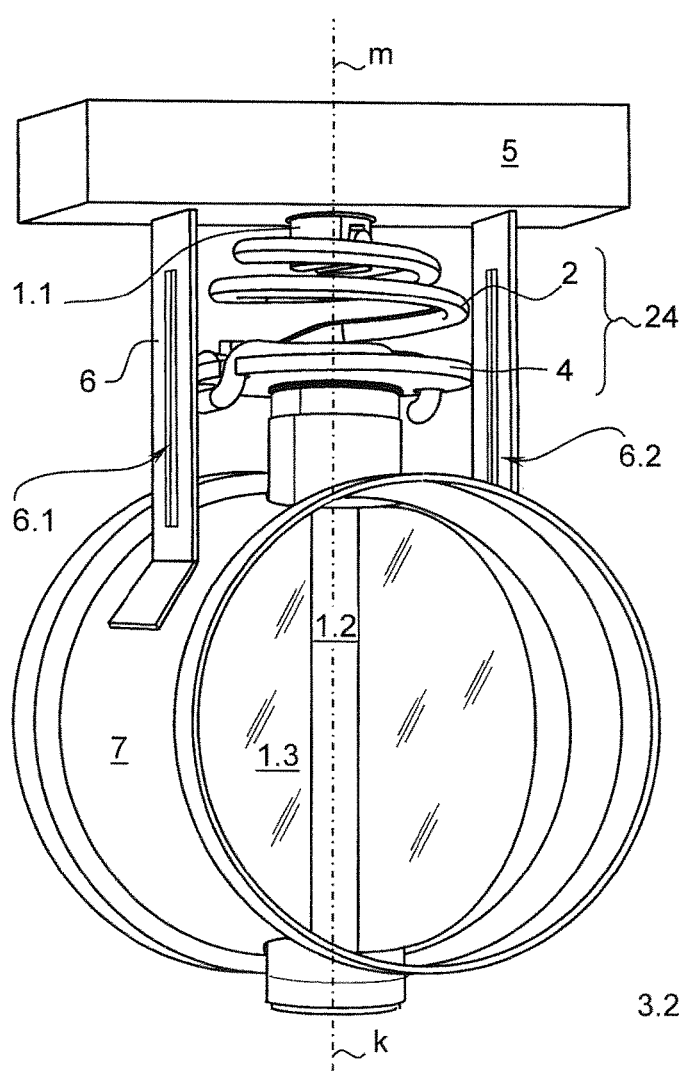
FIG. 1 shows a principle sketch of the exhaust gas flap driver with a motor exhaust gas flap and an exhaust gas flap channel in an exploded view.

An exhaust gas flap drive 1 shown in FIG. 1 is a part of an assembly grouping consisting of the motor 5 with a motor shaft 1.1, an exhaust gas flap 1.3 with an exhaust gas flap shaft 1.2 and an exhaust gas flap channel 7, wherein the motor drive 1.1 and the exhaust gas flap shaft 1.2 are connected via an assembly 24 consisting of a coupling element 2 and a coupling member 4.

The exhaust gas flap 1.3 with the exhaust gas flap shaft 1.2 is arranged in the exhaust gas flap channel 7. The assembly 24 sits on the exhaust gas flap shaft 1.2 which forms the torque connection between the exhaust gas flap shaft 1.2 and the drive shaft 1.1. The motor 5 is indirectly supported via a holder 6 on the exhaust gas flap channel 7. The recess 6 has two arms 6.1, 6.2, which are affixed to the exhaust gas flap channel 7. The arm 6.2 forms a stop for the coupling member 4 or a shoulder 4.2 of the coupling member 4 in the "open"

position of the exhaust gas flap 1.3. The stop of the exhaust gas flap 1.3 in the "closed" position is formed by the exhaust gas flap channel 7 itself. According to FIG. 1, the exhaust gas flap 1.3 is located in an interim position between the "open" and "closed" positions, so that the shoulder 4.2 does not lie in contact with the arm 6.2.

The coupling element 2 is designed as a conical spring and is coupled via a first end section E1 to the motor drive 1.1 and via a second end section E2 to the coupling member 4. For the purpose of coupling the coupling element 2 to the motor drive 1.1, the motor shaft has a groove 3, which has a trapezoid profile Q according to FIG. 2a, 2b. Through the insertion of the coupling element 2 with the end section E1 into the groove 3 and due to the axial pre-tension of the coupling element 2 that is created by the assembly, a force fit coupling occurs between the motor shaft 1.1 and the coupling element 2. The coupling element 2 is also connected to the coupling member 4 in a form fit manner. This is described in greater detail with reference to FIGS. 4a, 4b.

Figure 2A:
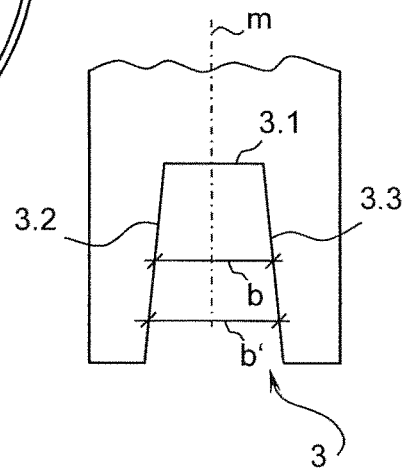
FIG. 2a shows the motor drive with a groove.
Figure 2B:
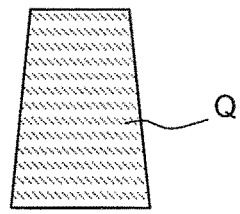
FIG. 2b shows the groove profile Q.

The trapezoid profile Q of the groove 3 according to FIGS. 2a, 2b guarantees a decreasing width b of the groove 3 towards a groove base 3.1. The two groove flanks 3.2, 3.3 of the groove 3 are accordingly pitched in relation to a middle axis m of the motor shaft 1.1 with a pitching angle of approximately 3°. In general, it would also be sufficient when only one groove flank 3.2, 3.3 were to be pitched differently to a trapezoid profile Q in order to guarantee said tapering of the groove 3. The width b, b' of the groove 3 varies and decreases, as described, towards the groove base 3.1. According to FIG. 2b, the profile Q is trapezoid. Alternatively, a tapering profile with a profile form that deviates from the trapezoid can also be used.

Figure 3:
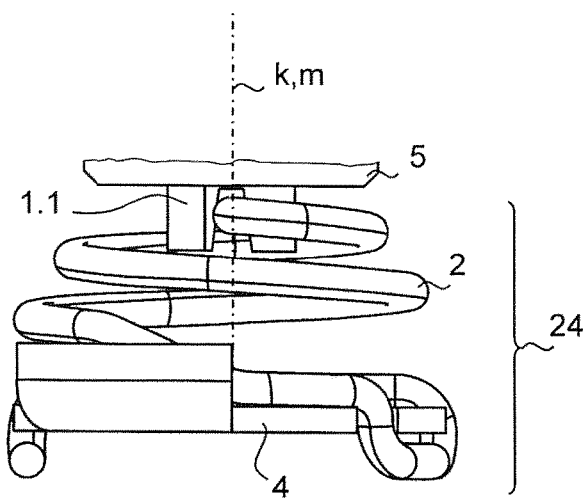
FIG. 3 shows the construction unit consisting of the coupling element and coupling member.

According to FIG. 3, the assembly consisting of the coupling element 2 and the coupling member 4 is affixed on the motor shaft 1.1 through the axial insertion of the end section E1 into the groove 3 of the motor shaft 1.1. Thus, the motor shaft 1.1 or a middle axis m and the exhaust gas flap shaft 1.2 to be inserted into the coupling member 4 or a middle axis k are aligned coaxially to each other.

Figure 4A:
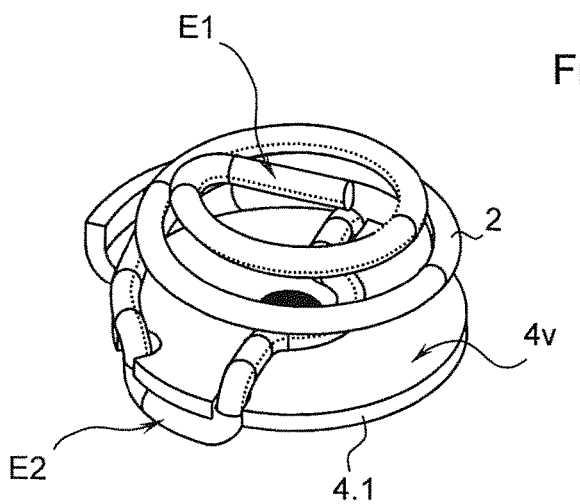
FIGS. 4a, 4b show the construction unit consisting of the coupling element and coupling member.
Figure 4B:
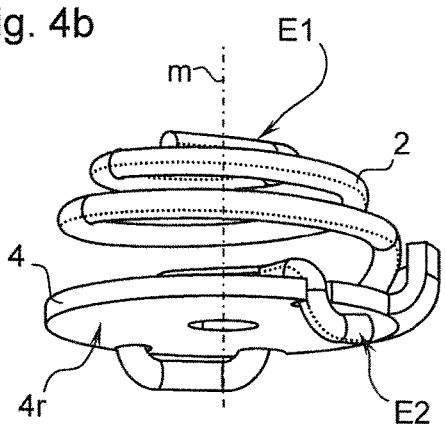
Figure 5A:
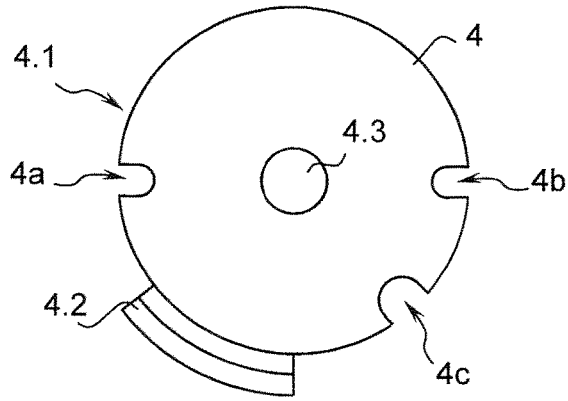
FIGS. 5a-5c show the coupling member.
Figure 5B:
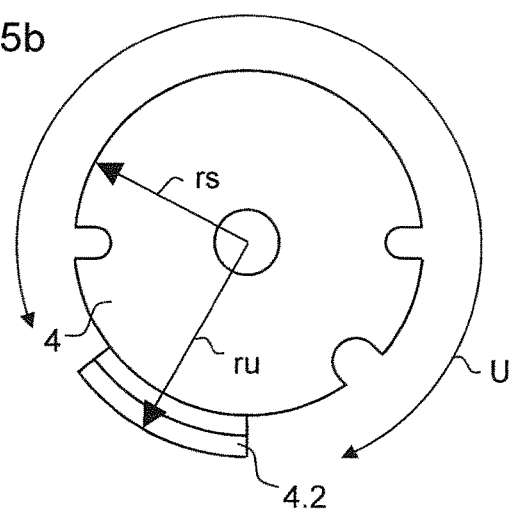

FIGS. 4a, 4b show the assembly 24, consisting of the coupling element 2 and coupling member 4 alone. The end section E1 limits the coupling element 2 upwards and is bent inwards in a radial direction, starting from the conical basic form of the coupling element 2. The end section E2 is designed in a somewhat more complex manner. Starting from the spiral or conical basic form of the coupling element 2, different bends are provided in order to mold the end section E2 to the coupling member 4. According to FIGS. 5a, 5b, the coupling member 4 has three slits 4a to 4c, wherein the slits 4a, 4b are diametrically arranged. Additionally, a third slit 4c is provided, within which the coupling element 2 is guided back onto a front side 4v, starting from a rear side 4r. The coupling member 4 is basically designed as a disc form, and has a shoulder 4.2 which protrudes in both the radial direction and in the axial direction over the disc-shaped basic form. The disc 4 has a base radius rs, while the should 4.2 has a radius ru that is extended beyond it. The slits 4a to 4c are provided in the area of a fine edge 4.1 of the disc 4. In the center, a bore hole or a hole 4.3 for holding the exhaust gas flap shaft 1.2 is provided. The coupling element 2 has a U-shaped part of the end section E2, into which the disc 4 is inserted in the radial direction until the coupling element 2 latches in both slits 4a, 4b. In conjunction with this, the coupling element 2 further latches in the slit 4c, so that the end section E2, starting from its free end in the area of the rear side 4r of the disc 4, is guided through the slit 4a onto the front side 4v and from there diametrically around the hole 4.3 through to the slit 4b. Further, the end section E2 is guided through the slit 4b onto the rear side 4r of the disc 4 and in turn over the slit 4c onto the front side 4v, and from there, moves into the spiral or conical basic form.

Figure 5C:
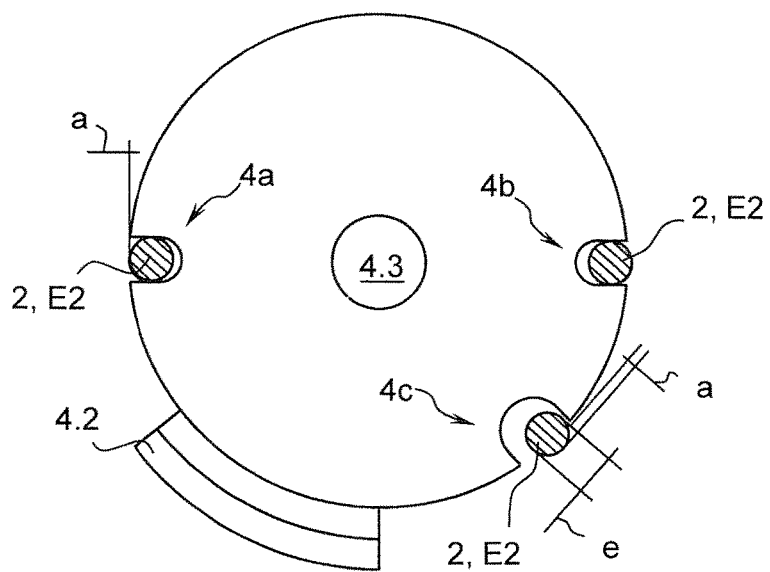

According to FIG. 5c, the coupling element 2 or the end section E2 guided through the slits 4a to 4c protrudes in the radial direction over the disc 4 by a maximum degree a. According to FIG. 5c, in the area of the slit 4a, the degree is a=0, while in the area of the slit 4c, the degree is $a_s0$. The degree a should not reach the maximum e/2 for guaranteeing a firm seat, however. The shoulder 4.2 protrudes over the edge 4.1 in the radial direction. It guarantees an end stop on the stop 6.2 of the holder 6, and therefore the end stop of the exhaust gas flap 1.3 in the "open" position. Via the motor 5 and the spring 2, an adjustment torque is transferred onto the exhaust gas flap shaft 1.2. Since an adjustment path of the exhaust gas flap shaft 1.2 is not recorded, it is necessary to design the adjustment torque to be sufficiently large, and therefore to render the angle of rotation of the motor 5 or drive shaft 1.1 sufficiently large so that via the spring torque thus generated, the respective end stop of the exhaust gas flap 1.3 or of the exhaust gas flap shaft 1.2 is achieved.

REFERENCE LIST exhaust gas damper drive
1.1 motor shaft, drive shaft
1.2 exhaust gas damper shaft
1.3 exhaust gas damper
2 coupling element, spring
3 groove
3.1 groove base
3.2 groove flank
3.3 groove flank
4 coupling member, disc
4.1 edge
4.2 shoulder
4.3 hole
4a recess, slit
4b recess, slit
4c recess, slit
4v front side
4r rear side
5 motor
6 recess, holder
6.1 arm
6.2 arm, stop
7 exhaust gas damper channel
24 assembly
a degree of 4, E2
b width of 3
b' width of 3
E1 end section of 2
E2 end section of 2
e thickness of E2
k middle axis of 1.3
m middle axis of 1.1
Q trapezoid profile of 3
rs radius of 4
ru radius of 4.2
U partial circumference of 4

What is claimed is:

1. An exhaust gas flap drive for an internal combustion machine, comprising:
   a drive shaft featuring a middle axis m,
   an exhaust gas flap shaft indirectly connected to the drive shaft and featuring a middle axis k having i) a first direction coaxial and parallel to the middle axis k and ii) a second direction coaxial and parallel to the middle axis k that is opposite the first direction, and
   a coupling element designed as a spring,
   wherein the coupling element has a first end section which is connected to the drive shaft in a torque-proof manner,
   wherein the drive shaft has a holder in which the first end section is supported,
   wherein the coupling element also has a second end section which is connected via a coupling member to the exhaust gas flap shaft in a torque-proof manner,
   wherein the coupling member and the second end section connection consists of an interlocking connection that prevents movement therebetween in both the first direction and the second direction and in a first circumferential direction determined with respect to the middle axis k and a second circumferential direction determined with respect to the middle axis k, with the second circumferential direction being opposite the first circumferential direction, and
   wherein the interlocking connection between the coupling member and the second end section has no degree of freedom, since the coupling member and the second end section have interlocking parts in all possible directions, and
   wherein the coupling member is designed at least partially as a disc with an edge running around the middle axis m, wherein on the edge, at least two or three recesses are provided which run radially, and which serve as a mount for the second end section.

2. The exhaust gas flap drive according to claim 1, wherein the disc has a front side and a rear side, wherein the front side and the rear side are on opposite sides of the disc in respect to the middle axis m, wherein the second end section is arranged on the front side and on the rear side.

3. The exhaust gas flap drive according to claim 1, wherein the disc has a radius rs and over a partial circumference U a shoulder which extends in a radial direction with respect to the middle axis k and/or an axial direction with respect to the middle axis k, with a radius ru, with ru >rs.

4. The exhaust gas flap drive according to claim 1, wherein the second end section has a thickness e, wherein the second end section protrudes over the disc in a radial direction to the middle axis k with a unit of measure a of $0<=2a<=e$.

5. The exhaust gas flap drive according to claim 1, wherein the holder is designed as a recess in the form of an axially aligned groove or in the form of a radially aligned bore hold, which is provided on an end side on the drive shaft, wherein the groove has a groove base and two groove flanks, which limit a width b of the groove, wherein the width b decreases towards the groove base.

6. A construction unit for an exhaust gas flap drive according to claim 1, consisting of the coupling element designed as a spring, wherein the coupling element additionally has the second end section which can be indirectly connected to the exhaust gas flap shaft, wherein the coupling member is provided which in relation to the first direction and the second direction with respect to the middle axis k and in the first circumferential direction and the second circumferential direction with respect to the middle axis k is connected in a form and/or force fit manner to the coupling element.

7. The exhaust gas flap drive according to claim 1, further comprising a motor which is connected to the drive shaft, and with an exhaust gas flap which is affixed to the exhaust gas flap shaft, and with an exhaust gas flap channel in which the exhaust gas flap is arranged.

8. The exhaust gas flap drive according to claim 7, further including at least a portion of an exhaust gas facility for a motor vehicle.

9. A construction unit for an exhaust gas flap drive according to claim 8, consisting of the coupling element designed as a spring, wherein the coupling element additionally has the second end section which can be indirectly connected to the exhaust gas flap shaft, wherein the coupling member is provided which in relation to the first direction and the second direction with respect to the middle axis k and in the first circumferential direction and the second circumferential direction with respect to the middle axis k is connected in a form and/or force fit manner to the coupling element.

10. The exhaust gas flap drive according to claim 1, wherein three recesses are provided, wherein two recesses are arranged diametrically to each other.

11. The exhaust gas flap drive according to claim 10, wherein the disc has a front side and a rear side, wherein the second end section is arranged on the front side and on the rear side.

12. The exhaust gas flap drive according to claim 11, wherein the disc has a radius rs and over a partial circumference U a shoulder which extends in a radial direction with respect to the middle axis k and/or an axial direction with respect to the middle axis k, with a radius ru, with ru >rs.

13. The exhaust gas flap drive according to claim 12, wherein the second end section has a thickness e, wherein the second end section protrudes over the disc in the radial direction to the middle axis k with a unit of measure a of $0<=2a<=e$.

14. The exhaust gas flap drive according to claim 13, wherein the holder is designed as a recess in the form of an axially aligned groove or in the form of a radially aligned bore hold, which is provided on an end side on the drive shaft, wherein the groove has a groove base and two groove flanks, which limit a width b of the groove, wherein the width b decreases towards the groove base.

15. The exhaust gas flap drive according to claim 14, further comprising a motor which is connected to the drive shaft, and with an exhaust gas flap which is affixed to the exhaust gas flap shaft, and with an exhaust gas flap channel in which the exhaust gas flap is arranged.

16. The exhaust gas flap drive according to claim 15, further including at least a portion of an exhaust gas facility for a motor vehicle.

17. A method for mounting an exhaust gas flap drive for an internal combustion machine with a drive shaft featuring a middle axis m with an exhaust gas flap shaft to be indirectly connected to the drive shaft and featuring a middle axis k, and with a coupling element designed as a spring, wherein the coupling element has a first end section which is connected to the drive shaft in a torque-proof manner, wherein the drive shaft has a holder in which the first end section is supported, wherein the coupling element also has a second end section which is connected via a coupling member to the exhaust gas flap shaft in a torque-proof manner, comprising the steps of:

a) connecting the coupling member to the exhaust gas flap shaft, and subsequently, connecting, through a connection that consists of an interlocking connection, the coupling element to the coupling member in an axial direction and in a circumferential direction to the middle axis m with no degree of freedom in the circumferential direction and the axial direction, since coupling member and second end section have interlocking parts in all possible directions, and subsequently, connecting the coupling element to the drive shaft, or b) connecting, through a connection that consists of an interlocking connection, the coupling element to the coupling member in the axial direction and in the circumferential direction to the middle axis m with no degree of freedom in the circumferential direction and the axial direction, since coupling member and second end section have interlocking parts in all possible directions, and subsequently, connecting the coupling member to the exhaust gas flap shaft, or connecting the coupling element to the drive shaft, and wherein several recesses are provided on the coupling member, and the second end section is clipped in a form fit manner into the recesses.

18. An exhaust gas flap drive for an internal combustion machine, comprising:

a drive shaft featuring a middle axis m, an exhaust gas flap shaft indirectly connected to the drive shaft and featuring a middle axis k having i) a first direction coaxial and parallel to the middle axis k and ii) a second direction coaxial and parallel to the middle axis k that is opposite the first direction, and a coupling element designed as a spring, wherein the coupling element has a first end section which is connected to the drive shaft in a torque-proof manner, wherein the drive shaft has a holder in which the first end section is supported, wherein the coupling element also has a second end section which is connected via a coupling member to the exhaust gas flap shaft in a torque-proof manner, wherein the coupling member and the second end section connection consists of an interlocking connection only, that prevents movement therebetween in both the first direction and the second direction and in a first circumferential direction determined with respect to the middle axis k and a second circumferential direction determined with respect to the middle axis k, with the second circumferential direction being opposite the first circumferential direction, and wherein the interlocking connection between the coupling member and the second end section consists of a clip connection, and wherein the coupling member is designed at least partially as a disc with an edge running around the middle axis m, wherein on the edge, at least two or three recesses are provided which run radially, and which serve as a mount for the second end section.

\* \* \* \* \*